United States Patent [19]

Joseph et al.

[11] Patent Number: 4,602,078

[45] Date of Patent: Jul. 22, 1986

[54] SILICONE ELASTOMERS AND ADHESION PROMOTER THEREFOR

[75] Inventors: Edward A. Joseph, Rode-St. Genese; Brian R. Trego, Vossem, both of Belgium

[73] Assignees: Dow Corning, Ltd., Barry, Wales; Dow Corning, S.A., Seneffe, Belgium

[21] Appl. No.: 754,096

[22] Filed: Jul. 12, 1985

[30] Foreign Application Priority Data

Jul. 26, 1984 [GB] United Kingdom ................ 8419106
Nov. 13, 1984 [GB] United Kingdom ................ 8428669

[51] Int. Cl.$^4$ ............................................. C08G 77/04
[52] U.S. Cl. ........................................ 528/34; 528/18; 528/19; 528/38
[58] Field of Search ................ 528/34, 38, 18, 19

[56] References Cited

U.S. PATENT DOCUMENTS 3,888,815  6/1975  Bessmer et al. ............... 260/37 SB
4,412,035  10/1975  Kurita ........................ 524/796

FOREIGN PATENT DOCUMENTS 841825  7/1960  United Kingdom .
844128  8/1960  United Kingdom .
938399  10/1963  United Kingdom .
867511  5/1967  United Kingdom .

Primary Examiner—Melvyn I. Marquis
Attorney, Agent, or Firm—Edward C. Elliott

[57] ABSTRACT

Composition comprising the product obtained by mixing (A) a silanol-terminated polydiorganosiloxane; (B) a silicon compound having at least 3 silicon-bonded alkoxy or alkoxyalkoxy groups in the molecule; (C) a metal or organometal salt of a carboxylic acid; (D) a silane having silicon-bonded alkoxy or alkoxyalkoxy groups and a silicon-bonded group, —R'NHR, in which R' is alkylene and R represents H, alkyl or an aliphatic hydrocarbon group containing at least one amino group, and (E) a silane having silicon-bonded alkoxy or alkoxyalkoxy groups and a silicon-bonded group containing an epoxy group.

The compositions cure to elastomers having improved adhesion to glass, aluminium and concrete and are suitable for use as sealants for buildings.

9 Claims, No Drawings

SILICONE ELASTOMERS AND ADHESION PROMOTER THEREFOR

This invention relates to silicone elastomer-forming compositions having improved substrate adhesion in the cured state and also relates to a composition for promoting such improved adhesion.

BACKGROUND INFORMATION

Silicone elastomer-forming compositions which are capable of curing to elastomers at normal ambient temperatures are now well known in the art. Such compositions are available as two types. One type comprises compositions which are supplied in a single package and which cure on exposure to the moisture in the atmosphere. The other type is supplied as a two package (or two part) composition which cures when the contents of the two packages are mixed in the appropriate proportions. Typically one package of the latter type of composition contains a hydroxyl-terminated polydiorganosiloxane and one or more fillers. The other package contains a silane or siloxane having on average more than two silicon-bonded alkoxy or alkoxyalkoxy groups per molecule and a curing catalyst. Other additives e.g. additional fillers, plasticisers and pigments may be present in either or both packages. Such two-package compositions are described in, for example, British Pat. Nos. 841 825, 844 128, 867 511 and 938 399.

For certain applications of the two part compositions it is often desired to improve the adhesion of the cured elastomer to a substrate, for example glass, aluminium or concrete. It is known that an improvement in adhesion can be realised by incorporating in the composition a silane or siloxane having amino-substituted organic groups in the molecule. One such adhesion promoter is aminopropyltriethoxysilane. Another known adhesion promoter for the two part compositions is glycidoxypropyltrimethoxysilane. Although both silanes provide good adhesion to a wide range of substrates it has been found that the adhesive bond degrades rapidly under wet conditions.

SUMMARY OF THE INVENTION

We have now surprisingly discovered that improved adhesion under wet conditions of the said two-package compositions can be realised if there are incorporated into the said compositions both an amino-substituted silane and a silane containing an epoxy group.

Accordingly this invention provides a composition comprising the product obtained by mixing (A) a silanol-terminated polydiorganosiloxane, (B) a crosslinking agent for (A) which is a silicon compound having in the molecule at least 3 silicon-bonded groups selected from alkoxy and alkoxyalkoxy groups having less than 6 carbon atoms, (C) a metal or organometal salt of a carboxylic acid, (D) a silane of the general formula

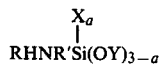

wherein R represents a hydrogen atom, an alkyl group having from 1 to 4 inclusive carbon atoms or an aliphatic hydrocarbon group attached to the nitrogen atom through a carbon to nitrogen bond and containing at least one amino group, R' represents an alkylene group having from 3 to 6 inclusive carbon atoms, X represents a monovalent hydrocarbon group having from 1 to 6 inclusive carbon atoms, Y represents an alkyl or alkoxyalkyl group having less than 6 carbon atoms and a has a value of 0 or 1, and (E) a silane of the general formula

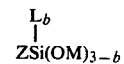

wherein Z represents an organic group composed of carbon, hydrogen and oxygen having therein at least one group of the formula

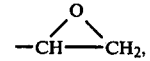

L represents an alkyl group having from 1 to 4 inclusive carbon atoms, or a phenyl group, M represents an alkyl or an alkoxyalkyl group having less than 6 carbon atoms and b has a value of 0 or 1.

The invention also provides a process for the preparation of an elastomer which comprises mixing components (A) to (E) as hereinabove defined and thereafter curing the composition.

In the polydiorganosiloxanes (A) the organic substituents can be lower aliphatic hydrocarbon groups e.g. methyl, ethyl, propyl or vinyl, phenyl or fluorinated hydrocarbon groups e.g. 3.3.3-trifluoropropyl. Preferably at least 50 percent of the substituents are methyl with any remaining groups being selected from phenyl and vinyl; the most preferred poldiorganosiloxanes being the polydimethylsiloxanes. The viscosity of the polydiorganosiloxane is not critical and will depend upon various factors including the intended application of the end-product. Generally polydiorganosiloxanes having viscosity within the range from 500 to 100,000 mPa.s at 25° C. can be employed, the preferred polydiorganosiloxanes being those having a viscosity in the range from 1000 to 75000 mPa.s at 25° C. Polydiorganosiloxanes (A) are well known substances. They are widely employed in the manufacture of room temperature vulcanising silicone elastomers and may be represented by the general formula HO—SiR"$_2$(OSiR"$_2$)$_x$OH wherein each R" represents an organic substituent e.g. methyl, and x is an integer, preferably having an average value of from about 300 to about 1500.

As the crosslinking agent (B) there may be employed any silicon compound, or mixtures thereof, having in the molecule at least three silicon-bonded alkoxy or alkoxyalkoxy groups. The silicon compound may be a silane or a siloxane. Illustrative of such silicon compounds are alkyl orthosilicates e.g. ethyl orthosilicate and propyl orthosilicate, alkyl polysilicates e.g. ethyl polysilicate an n-propyl polysilicate, monoorganotrialkoxysilanes e.g. methyl trimethoxysilane, ethyl trimethoxysilane, methyl tri n-propoxysilane, butyl triethoxysilane and phenyl trimethoxysilane. Other silicon compounds which can be employed include Si(OCH$_2$C-H$_2$OCH$_3$)$_4$ and methylpolysiloxanes containing silicon-bonded alkoxy groups e.g. methoxy or ethoxy groups. In general the preferred crosslinking agents (B) are silanes having 3 or 4 alkoxy groups attached to the silicon atom or the partial hydrolysis and condensation products of such silanes. The silicon compound (B) is normally employed in a proportion of from about 1 to about 15 parts by weight per 100 parts by weight of the silanol-terminated polydiorganosiloxane (A).

Component (C) of the compositions of this invention is a curing catalyst and comprises a metal or organo-metal salt of a carboxylic acid. The metal may be e.g. zinc, cobalt or lead but is preferably tin. Examples of salts (C) are zinc naphthenate, lead octoate, stannous octoate, dibutyltin dilaurate, dibutyltin dioctoate and dibutyltin diversatate. The curing catalyst (C) is generally employed in a proportion of from 0.1 to 10 percent by weight based on the weight of (A).

Compositions comprising (A), (B) and (C) are well-known in the organosilicon art and include commercially available materials. Such compositions have been described in, for example, British Pat. Nos. 841 825, 844 128 and 938 399.

Component (D) of the compositions of this invention comprises one or more silanes having in the molecule silicon-bonded hydrocarbonoxy groups and a silicon-bonded hydrocarbon group (preferably having no more than 12 carbon atoms) containing at least one amino group. In the general formula of the silanes (D) the substituent R may be hydrogen, lower alkyl or an aliphatic group containing at least one amino group. R may therefore represent for example H, methyl, ethyl, propyl, the group $-(CH_2CH_2NH)_zH$ wherein z is an integer, preferably 1 or 2, or the group $H_2NQ-$ wherein Q is a divalent hydrocarbon group e.g. $-CH.CH_3CH_2-$, $-(CH_2)_4-$ or $-(CH_2)_5-$. The substituent Y may be for example, methyl, ethyl or methoxyethyl. Preferred as component (D) are compounds represented by the formulae

$H_2N(CH_2)_2NHR'Si(OY)_3$ and

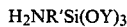
$H_2NR'Si(OY)_3$ wherein R' represents an alkylene group having 3 or 4 carbon atoms e.g. $-(CH_2)_3-$ or $-CH_2CH.CH_3CH_2-$ and each Y represents methyl, ethyl or methoxyethyl.

As component (E) of the compositions there are employed one or more silanes having silicon-bonded hydrocarbonoxy groups and a silicon-bonded organic group having therein an epoxy group. In the general formula of the silanes (E) the substituent Z may be an epoxy-containing organic group composed of carbon, hydrogen and oxygen. Examples of such substituents are those represented by the general formula

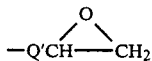

wherein Q' represents a divalent group e.g. $-CH_2CH_2-$, $-(CH_2)_3-$, $-CH_2CH.CH_3CH_2-$, phenylene, cyclohexylene,

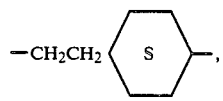

$-CH_2CH_2OCH_2CH_2-$ and $-CH_2CH_2OCH(CH_3)CH_2-$. The group M may be for example methyl, ethyl or methoxyethyl. Preferably Z represents the group

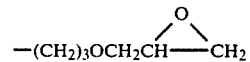

and M is methyl or ethyl.

Improved adhesion of the cured elastomer to glass, aluminium and concrete under wet conditions has been observed when the molar ratio of the amino silane (D) to the epoxy silane (E) present in the composition lies in the range from about 0.1:1 to about 3:1. However, optimum results appear to be obtained when the ratio of (D) to (E) is in the range from 0.4:1 to 0.7:1. The degree of improved adhesion of the cured elastomer under wet conditions is dependent to some extent on the proportion of (D) and (E) incorporated into the curable composition. Best results are obtained when the total weight of (D) and (E) employed is from about 1.5 to about 4.5 percent based on the weight of the polydiorganosiloxane (A). More than 4.5 percent by weight may be employed but no further improvement in adhesion is believed to accrue at such higher levels of addition.

The compositions of this invention may be prepared by simply mixing the components (A) to (E) in the desired proportions. However, compositions of the type comprising (A), (B) and (C) are normally supplied as a two package product wherein the catalyst (C) is packaged separately from the polydiorganosiloxane (A). The crosslinker (B) may be mixed with (A) or with (C) or with both. In use the contents of the packages are mixed and curing commences. Silane (E) may therefore be packaged as a mixture with the polydiorganosiloxane (A) and silane (D) may be present in admixture with the catalyst. Where storage stability of the compositions is required it is desirable that the aminosilane (D) should not be mixed with (A). However, it has been found that the best results are obtained when (D) and (E) are brought together prior to mixing with the remaining components of the elastomer-forming composition. Components (D) and (E) may therefore be mixed together and packaged separately from the two packages containing (A), (B) and (C). Preferably, however, (D) and (E) are packaged as a mixture with the catalyst (C) and the elastomer-forming composition supplied as a two-package product. The reason for the improved adhesion resulting from the combination of (D) and (E) is not known. It is believed, however, that the silanes react together when mixed, and that it is the reaction product which contributes to the improved adhesion under wet conditions. If desired the mixture may be heated (e.g. to 25°–70° C.) to increase the speed or degree of reaction. However, such a heating step is not essential.

In addition to components (A) to (E) defined hereinabove the compositions of this invention may contain any of the other ingredients normally present in silicone elastomer-forming compositions. In particular any of a variety of fillers may be incorporated, for example silica aerogel, diatomaceous earth, crushed quartz, zinc oxide, titanium dioxide, calcium carbonate, iron oxide and carbon black. Other ingredients which may also be present are pigments, heat stability additives and polydiorganosiloxanes, e.g. polydimethylsiloxanes having triorganosilyl units e.g. trimethylsilyl units at one or both ends of the molecule.

When cured the compositions of this invention exhibit good adhesion, particularly under wet conditions, to substrates such as glass, aluminium, concrete, and plastics e.g. polycarbonates, polyester and ABS. They are therefore particularly adapted for use in applications where such adhesion is required, for example as sealants for glazed units and concrete structures. It has been observed that in addition to improved adhesion the cured elastomer exhibits reduced water pick-up when compared with elastomers employing the known aminosilane additives.

The following examples in which the percentages are expressed by weight illustrate the invention.

EXAMPLE 1

A two-part elastomer-forming composition was prepared as follows:

| Part A was prepared by mixing | |
|---|---|
| silanol-terminated polydimethylsiloxane (12,500 mPa.s at 25° C.) | 50% |
| calcium carbonate | 50% |
| Part B was obtained by mixing | |
| $Si(OCH_2CH_2CH_3)_4$ | 25.8% |
| carbon black | 7.5% |
| dibutyltin dilaurate | 0.55% |
| trimethylsilyl end-stopped polydimethylsiloxane (12,500 mPa.s at 25° C.) | 66.15% |

To Part B was added 5.0% of $NH_2(CH_2)_3Si(OC_2H_5)_3$ and 8.3% of

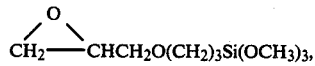

representing a molar ratio of amino silane to epoxy silane of 0.65:1. This composition was allowed to stand at room temperature for 24 hours.

Parts A and B were then thoroughly mixed together in a weight ratio of 10 parts A to 1 part B and the resulting composition employed to make 'H-pieces' for testing according to SNJF (France) Test Method 85-504. The 'H-pieces' were fabricated employing parallel plates (5 cm×5 cm) of glass, milled aluminium and concrete respectively, a rectangular bead of the cured elastomer forming the crossmember between the plates.

The concrete 'H-pieces' were placed in water at 50° C. for 3 days and the plates pulled apart at a speed of 50 mm per minute, the pulling force at which failure of the sample occurred being recorded. The failed sample was also inspected to ascertain the mode of failure. Cohesive failure is recorded when the elastomer fails internally. Adhesive failure occurs when the elastomer separates from the substrate without tearing. Cohesive failure indicates that the adhesive bond between the elastomer and the substrate is stronger than the elastomer itself. Boundary failure is a condition in which separation is not clearly the result of adhesive failure but takes place close to the elastomer/substrate interface. When only cohesive failure is specified in the data herein any remaining percentage failure is adhesive.

The results obtained with the concrete test pieces were as follows:

TABLE 1a

| Days Immersion | Force at Break (kg) | Failure Mode |
|---|---|---|
| 3 | 46 | 20% cohesive |

When test pieces of glass and aluminium were immersed in water at 50° C. and 90° C. for the periods indicated and then pulled apart as described above the test results were as follows:

TABLE 1b

| Substrate | Immersion | Force at Break (kg) | Failure Mode |
|---|---|---|---|
| | (90° C.) (hours) | | |
| glass | 0 | 65 | 100% cohesive |
| glass | 75 | 32 | 80% cohesive |
| glass | 100 | 25 | 30% cohesive |
| aluminium | 100 | 30 | 80% cohesive |
| | (50° C.) (days) | | |
| glass | 75 | 39 | 90% cohesive |

EXAMPLE 2

In this example the sealant composition and the catalyst/adhesion promoter were prepared as in Example 1 except that the mixture of gamma-aminopropyltriethoxysilane and gamma-glycidoxypropyltrimethoxy silane were combined in a ratio of 0.85:1. The mixture was added to part B in an amount sufficient to provide 5.9% amino silane and 7.4% epoxy silane and "H-pieces" were made using glass substrates. The performance of this adhesion promoter in the sealant in glass "H-pieces" is shown in Table 2:

TABLE 2

| | 90° C. Water Test | |
| Hours | Force at Break in kg | Failure Mode |
|---|---|---|
| 0 | 64 | 100% cohesive |
| 75 | 25 | 30% cohesive |

Compared with the results shown in Table 1b, the results in Table 2 show the adhesion promoter of Example 2, to be less effective in the elastomer-forming composition under test.

EXAMPLE 3

In this example the sealant composition and the catalyst/adhesion promoter were prepared as in Example 1 except that the silanes were incorporated into Part B in an amount sufficient to provide 2.9% of epoxy silane and 1.7% of amino silane. The performance of this adhesion promoter in the sealant in glass "H-pieces" is shown in Table 3.

TABLE 3

| | 90° C. Water Test | |
| Hours | Force at Break in kg | Failure Mode |
|---|---|---|
| 0 | 50 | 100% cohesive |
| 75 | 19 | 30% cohesive |
| 100 | 12 | 10% cohesive |

EXAMPLE 4

In this example the sealant and the adhesion promoter were prepared as in Example 1 except that the mixture of silanes was added in an amount sufficient to provide 21.4% of epoxy silane and 13% of amino silane based on Part B. The results obtained from tests on glass "H-pieces" are shown in Table 4.

TABLE 4

| | 90° C. Water Test | |
| Hours | Force at Break in kg | Failure Mode |
| --- | --- | --- |
| 0 | 62 | 100% cohesive |
| 75 | 21 | 100% adhesive or boundary |
| 100 | 10 | 100% adhesive or boundary |

EXAMPLE 5

In this example, the sealant and the adhesion promoter were prepared as in Example 1 except that N-(trimethoxysilylpropyl)ethylenediamine was used in place of gamma-aminopropyltrimethoxysilane. The amino/epoxy-functional silane molar ratio was 0.45/1 and this adhesion promoter was added to Part B in an amount sufficient to provide 9.4% of epoxy silane and 4.2% of amino silane (based on the weight of Part B). The sealant was tested on glass and milled aluminium as described in Example 1, and the results are shown in Table 5.

TABLE 5

| | 90° C. Water Test | |
| Hours | Force at Break in kg | Failure Mode |
| --- | --- | --- |
| | Glass | |
| 0 | 61 | 100% cohesive |
| 75 | 30 | 70% cohesive |
| 100 | 21 | 100% adhesive and boundary |
| | Milled Aluminium | |
| 100 | 35 | 100% adhesive and boundary |

By comparing the results shown in Table 5 with those shown in Table 1b it can be seen that the adhesion promoter of this example provides adhesion of the sealant to glass and aluminium substrates which is comparable to that obtained with the silane mixture used in Example 1.

EXAMPLE 6

In this example, the sealant and adhesion promoter were made as in Example 5 except that the ratio of diamino to epoxyfunctional silane was changed to 0.25, sufficient of the mixture of silanes being added to Part B to provide 11% of the epoxy silane and 2.7% of the amino silane. The resulting sealant was tested for adhesion to glass and to milled aluminium according to the procedure described in Example 1. The results are shown in Table 6.

TABLE 6

| | 90° C. Water Test | |
| Hours | Force at Break in kg | Failure Mode |
| --- | --- | --- |
| | Glass | |
| 0 | 54 | 100% cohesive |
| 75 | 14 | 100% adhesive and boundary |
| 100 | 8 | 100% adhesive and boundary |
| | Milled Aluminium | |
| 100 | 24 | 100% adhesive |

TABLE 6-continued

| | 90° C. Water Test | |
| Hours | Force at Break in kg | Failure Mode |
| --- | --- | --- |
| | | and boundary |

EXAMPLE 7

In this comparative example the sealant and the adhesion promoter are prepared as in Example 1 except that the epoxy silane was omitted and only the amino silane was employed as the adhesion promoter. It was added to part B in proportion of 12.8% by weight based on the weight of Part B. The resulting sealant was formed into "H-pieces" using concrete, glass and milled aluminium substrates and tested for adhesion as described in Example 1. The results are shown in Table 7.

TABLE 7

| | 50° C. Water Test | |
| Days | Force at Break in kg | Failure Mode |
| --- | --- | --- |
| | Glass | |
| 0 | 60 | 100% cohesive |
| 60 | 17 | 30% cohesive |
| | Milled Aluminium | |
| 60 | 33 | 65% cohesive |
| | Concrete | |
| 3 | 23 | 100% adhesive and boundary |

| | 90° C. Water Test | |
| Hours | Force at Break in kg | Failure Mode |
| --- | --- | --- |
| | Glass | |
| 50 | 13 | 100% adhesive and boundary |
| 75 | 8 | 100% adhesive |
| 100 | 6 | 100% adhesive |
| | Milled Aluminum | |
| 100 | 16 | 100% adhesive and boundary |

A comparison of the results shown in Table 7 with those shown in Tables 1a and 1b give a clear indication of the improvement in adhesion shown by the adhesion promoter of the present invention. A comparison of the results of Table 7 with those shown in tables 2 and 3 indicates the improved performance of the adhesion promoter of the present invention over the prior art adhesion promoter of Example 7 even when the adhesion promoter of the present invention is used in a non-preferred ratio of amino silane to expoxy silane (as in Example 2) or in a non-preferred concentration (as in Example 3).

EXAMPLE 8

In this comparative example the procedure of Example 1 was repeated except that the amino silane was omitted and only the epoxy silane was used as the adhesion promoter. It was added to Part B in a proportion of 13.7% by weight based on the weight of Part B. "H-pieces" made from the resulting sealant on glass and aluminium substrates were subjected to the 50° C. and 90° C. water tests described above. The results are shown in Table 8.

TABLE 8

| 50° C. Water Test |
| --- |

TABLE 8-continued

| Days | Force at Break in kg | Failure Mode |
|---|---|---|
| | Glass | |
| 0 | 60 | 100% cohesive |
| 60 | 19 | 35% cohesive |

| | 90° C. Water Test | |
|---|---|---|
| Hours | Force at Break in kg | Failure Mode |
| | Glass | |
| 75 | 12 | 100% adhesive and boundary |
| 100 | 4 | 100% adhesive |
| | Milled Aluminium | |
| 0 | 45 | 95% cohesive |
| 100 | 5 | 100% adhesive |

A comparison of the results shown in Table 8 with those shown in Table 1 indicates the dramatic improvement in the performance of the adhesion promoter of the present invention over the performance obtained by using only an epoxyfunctional silane as an adhesion promoter.

EXAMPLE 9

In this comparative example the procedure of Example 1 was repeated except that the amino silane/epoxy silane molar ratio was 2.5. The amino silane and epoxy silane were added in proportions of 9.2% and 3.9% respectively based on the weight of Part B. Sealant made according to this example was tested on glass and milled aluminium substrates according to the procedure of Example 1. The results are shown in Table 9.

TABLE 9

| | 50° C. Water Test | |
|---|---|---|
| Days | Force at Break in kg | Failure Mode |
| | Glass | |
| 0 | 64 | 100% cohesive |
| 60 | 18 | 20% cohesive |
| | Milled Aluminium | |
| 60 | 47 | 90% cohesive |

By comparing the results shown in Table 9 with those shown in Table 7, it is seen that the adhesion promoter made of the silane of Example 1 shows no improvement in glass adhesion, when the components are combined at a 2.5 aminofunctional silane/epoxyfunctional silane molar ratio, but that some improvement in aluminium adhesion is evident.

EXAMPLE 10

In this example the sealant and the adhesion promoter were prepared according to Example 1 except that the amino silane/epoxy silane ratio was 0.4/1. The amino silane and epoxy silane were added in proportions of 3.7% and 9.8% respectively based on Part B. "H-pieces" were made using the resulting sealant with glass and milled aluminium substrates.

The "H-pieces" were subjected to the tests described in Example 1 and the test results are shown in Table 10.

TABLE 10

| | 50° C. Water Test | |
|---|---|---|
| Days | Force at Break in kg | Failure Mode |
| | Glass | |
| 0 | 71 | 100% cohesive |
| 60 | 58 | 90% cohesive |
| | Milled Aluminium | |
| 60 | 47 | 90% cohesive |

| | 90° C. Water Test | |
|---|---|---|
| Hours | Force at Break in kg | Failure Mode |
| | Glass | |
| 50 | 38 | 60% cohesive |
| 75 | 30 | 50% cohesive |
| 100 | 25 | 10% cohesive |

A comparison of the results shown in Table 10 with those shown in Tables 7 and 8 indicate that an amino silane/epoxy silane ratio of 0.4 achieves better adhesion of the sealant to glass and milled aluminium substrates than does either of the silanes alone when added at the same concentration.

EXAMPLE 11

In this comparative example a two-part silicone sealant composition is made by mixing as Part A 50% of 50,000 mPa.s silanol-terminated polydimethylsiloxane and 50% of 5 micron ground quartz filler and by mixing as Part B 20% ethylorthosilicate, 13% of the amino silane adhesion promoter employed in Example 7; 0.25% dibutyltindilaurate and the balance to 100% of trimethylsilylend stopped polydimethylsiloxane having a viscosity of 12,500 mPa.s at 25° C. Parts A and B were mixed in a ratio of 10 parts A to one part of B and the resulting composition was cured to form "H-pieces" on glass substrates as in Example 1. The resulting "H-pieces" were subjected to a 90° C. water test and the results are shown in Table 11.

TABLE 11

| | 90° C. Water Test | |
|---|---|---|
| Hours | Force at Break in kg | Failure Mode |
| 7 | 2 | 100% adhesive |

EXAMPLE 12

In this example a silicone sealant was prepared as in Example 11 except that the adhesion promoter added to Part B was a mixture of the amino silane and epoxy silane described in Example 1 combined at amino silane/epoxy silane molar ratio of 0.65/1 and added to Part B in proportions of 8.3% epoxy silane and 5% amino silane based on the weight of Part B.

Parts A and B were mixed to form a curable silicone sealant which was cured into "H-pieces" using glass substrates. The cured "H-pieces" were subjected to 90° C. water tests as in Example 11 and produced the results shown in Table 12.

TABLE 12

| | 90° C. Water Test | |
|---|---|---|
| Hours | Force at Break in kg | Failure Mode |
| 7 | 14 | 35% cohesive |

EXAMPLE 13

A two-part elastomer-forming composition was prepared as described in Example 1. To Part A was added 0.83% (based on weight of Part A) of the epoxy silane described in Example 1 and to Part B was added 5.0% by weight (based on the weight of Part B) of the amino silane of that Example. Parts A and B were then thoroughly mixed together in a ratio by weight of 10 parts A to 1 part of B. The composition was employed to fabricate glass substrate 'H-pieces' and the pieces tested as described in Example 1 following immersion in water at 90° C. The test results were as follows:

| | 90° C. Water Test | |
|---|---|---|
| Hours | Force at Break in kg | Failure Mode |
| 0 | 64 | 100% cohesive |
| 75 | 19 | 100% adhesive and boundary |
| 100 | 11 | 100% adhesive and boundary |

That which is claimed is:

1. A composition comprising the product obtained by mixing (A) a silanol-terminated polydiorganosiloxane, (B) a crosslinking agent for (A) which is a silicon compound having in the molecule at least three silicon-bonded groups selected from alkoxy and alkoxyalkoxy groups having less that 6 carbon atoms wherein any remaining silicon-bonded substituents are those composed of carbon and hydrogen atoms, (C) a metal or organometal salt of a carboxylic acid, (D) a silane of the general formula

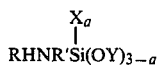

wherein R represents a hydrogen atom, an alkyl group having from 1 to 4 inclusive carbon atoms or an aliphatic hydrocarbon group attached to the nitrogen atom through a carbon to nitrogen bond and containing at least one amino group, R' represents an alkylene group having from 3 to 6 inclusive carbon atoms, X represents a monovalent hydrocarbon group having from 1 to 6 inclusive carbon atoms, Y represents an alkyl or alkoxyalkyl group having less than 6 carbon atoms and a has a value of 0 or 1, and (E) a silane of the general formula

in which Z represents an organic group composed of carbon, hydrogen and oxygen having therein at least one group of the formula

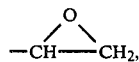

L represents an alkyl group having from 1 to 4 inclusive carbon atoms, or a phenyl group, M represents an alkyl or an alkoxyalkyl group having less than 6 carbon atoms and b has a value of 0 or 1, (D) and (E) being employed in a ratio of from 0.1 to 3 moles of (D) per mole of (E).

2. A composition as claimed in claim 1 wherein the cross linking agent (B) is selected from the group consisting of silanes having 3 or 4 alkoxy groups attached to silica and partial hydrolysis and condensation product of said silanes.

3. A composition as claimed in claim 1 wherein (C) is selected from tin and organotin salts of carboxylic acid.

4. A composition as claimed in claim 1 wherein (D) is selected from the group consisting of silanes of the general formulae

and

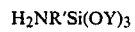

wherein R' represents an alkylene group having 3 or 4 carbon atoms and each Y represent methyl, ethyl or methoxyethyl.

5. A composition as claimed in claim 1 wherein (E) is a silane of the general formula

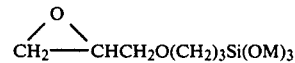

wherein M is methyl or ethyl.

6. A composition as claimed in claim 1 wherein the molar ratio of the amino silane (D) to the epoxy silane (E) is in the range from 0.4:1 to 0.7:1.

7. A composition as claimed in claim 1 wherein (D) and (E) are employed in a total weight of from 1.5 to 4.5 percent by weight based on the weight of (A).

8. A composition as claimed in claim 1 wherein (D) and (E) have been mixed together prior to mixing with the remaining components of the composition.

9. A process for the preparation of an elastomer which comprises mixing (A) a silanol-terminated polydiorganosiloxane, (B) a crosslinking agent for (A) which is a silicon compound having in the molecule at least three silicon-bonded groups selected from alkoxy and alkoxyalkoxy groups having less than 6 carbon atoms wherein any remaining silicon-bonded substituents are those composed of carbon and hydrogen atoms, (C) a metal or organometal salt of a carboxylic acid, (D) a silane of the general formula

wherein R represents a hydrogen atom, an alkyl group having from 1 to 4 inclusive carbon atoms or an aliphatic hydrocarbon group attached to the nitrogen atom through a carbon to nitrogen bond and containing at least one amino group, R' represents an alkylene group having from 3 to 6 inclusive carbon atoms, X represents a monovalent hydrocarbon group having from 1 to 6 inclusive carbon atoms, Y represents an alkyl or alkoxyalkyl group having less than 6 carbon atoms and a has a value of 0 or 1, and (E) a silane of the general formula

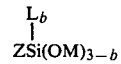

in which Z represents an organic group composed of carbon, hydrogen and oxygen having therein at least one group of the formula

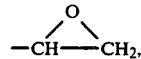
L represents an alkyl group having from 1 to 4 inclusive carbon atoms, or a phenyl group, M represents an alkyl or an alkoxyalkyl group having less than 6 carbon atoms and b has a value of 0 or 1, (D) and (E) being employed in a ratio of from 0.1 to 3 moles of (D) per mole of (E), and thereafter allowing the mixture to cure to an elastomer.
* * * * *